United States Patent [19]

Holgersson

[11] Patent Number: 4,976,471

[45] Date of Patent: Dec. 11, 1990

[54] MILL

[76] Inventor: Lennart Holgersson, Smedgartan 44, 330 10 Bredaryd, Sweden

[21] Appl. No.: 411,528

[22] PCT Filed: May 13, 1988

[86] PCT No.: PCT/SE88/00245

§ 371 Date: Sep. 29, 1989

§ 102(e) Date: Sep. 29, 1989

[87] PCT Pub. No.: WO88/08751

PCT Pub. Date: Nov. 17, 1988

[51] Int. Cl.$^5$ ............................................. B02C 18/18
[52] U.S. Cl. ....................................... 241/73; 241/247; 241/294; 241/242
[58] Field of Search ...................... 241/101.7, 73, 246, 241/247, 222, 224, 225, 242, 260.1, 294, 293

[56] References Cited

U.S. PATENT DOCUMENTS

| | | |
|---|---|---|
| 1,605,007 | 11/1926 | Smith et al. |
| 1,608,460 | 11/1926 | Blankenship .................... 241/247 X |
| 1,902,653 | 3/1933 | Lindgren ............................. 241/247 |
| 2,656,122 | 10/1953 | Borner ............................... 241/260.1 |
| 3,865,319 | 2/1975 | Hoffman ............................. 241/73 X |
| 4,009,837 | 3/1977 | Schnyder ......................... 241/294 X |
| 4,071,198 | 1/1978 | Tetreault .............................. 241/73 |

FOREIGN PATENT DOCUMENTS

| | | |
|---|---|---|
| 2709360 | 9/1978 | Fed. Rep. of Germany. |
| 552200 | 11/1956 | Italy ................................... 241/247 |

Primary Examiner—Mark Rosenbaum
Attorney, Agent, or Firm—Beveridge, DeGrandi & Weilacher

[57] ABSTRACT

The disclosure relates to an apparatus for granulating excess material in the production of plastic article by means of knives (41) disposed at one end of a feeder screw (20) and cooperating with a number of preferably fixed counter knives (41) and a grid (57), each knife rotating with the screw (20) having a seat (40) which extends between an end plate (26) and a ring (31) most proximal the end of the screw (20) and being fixed therein at the ends, a knife blade (41) adapted to the configuration of the seat (40), and a bar (42) for fixedly clamping the knife blade (41) in the seat (40).

10 Claims, 5 Drawing Sheets

MILL

The present invention relates to an apparatus in a machine for the comminution of plastic, wood or similar materials into smaller pieces, for example granules in respect of plastic, and chips in respect of wood etc., with the assistance of knives disposed at one end of a feeder screw, these knives cooperating with a number of preferably fixed counter knives and a grid.

Prior art machines or apparatuses of this type are often designated granulators and have a feeder screw with a core and conventional, subsequently sharpenable and adjustable knives in the cutting tool assembly, whether this is disposed about a part of the feeder screw or at the side thereof. In addition, in the latter case, special driving of the screw is required, as well as special driving of the cutting tool assembly which is often designated quite simply a "cutter". The major drawback inherent in these prior art machines resides in the limited possibilites of influencing machine output capacity and the long down-times on overhaul and repair of, above all, the cutter. In most cases, each machine for manufacturing plastic articles is allocated at least one granulator for comminuting excess material. In many cases, because of the long down-times, and also to some degree insufficient capacity, it has proved necessary to provide more than one granulator to cater for the excess material from production.

The task forming the basis of the present invention is to obviate or at least reduce the above-mentioned drawbacks in the prior art comminution machines.

This task is solved according to the present invention in the apparatus disclosed by way of introduction, in that each knife rotating with the screw has a seat which extends between an end plate and a ring most proximal the end of the screw and fixed therein at the ends, a knife blade adapted to the configuration of the seat and a bar for fixedly clamping the knife blade in the seat.

One advantage afforded by the apparatus according to the present invention resides in the cutter assembly which permits the employment of one or more cutting knives without any need for aftersetting or after-adjustment. In addition, hoods, grids, receptacles etc. are provided with quick couplings which, together with rapid knife replacement, makes for extremely short down-times and, thereby, a considerable reduction of necessary operational stoppages. An apparatus according to the present invention also permits relatively simple adaptation of the machine to other feeding equipment in the production hall. By means of an apparatus according to the present invention, there will be achieved a considerably more rapid through flow through the machine and higher output capacity, and, moreover, large variations in the infed excess material will be accepted without any appreciable - and in most cases without any -influence on the final result which, in most cases, displays a high degree of uniformity in particle size.

The present invention will be described in greater detail below with particular reference to the accompanying Drawings. In the accompanying Drawings FIG. 1 is a side elevation, partly in section, of one embodiment of an apparatus according to the present invention, a number of parts having been omitted for purposes of clarity.

Figure 1:
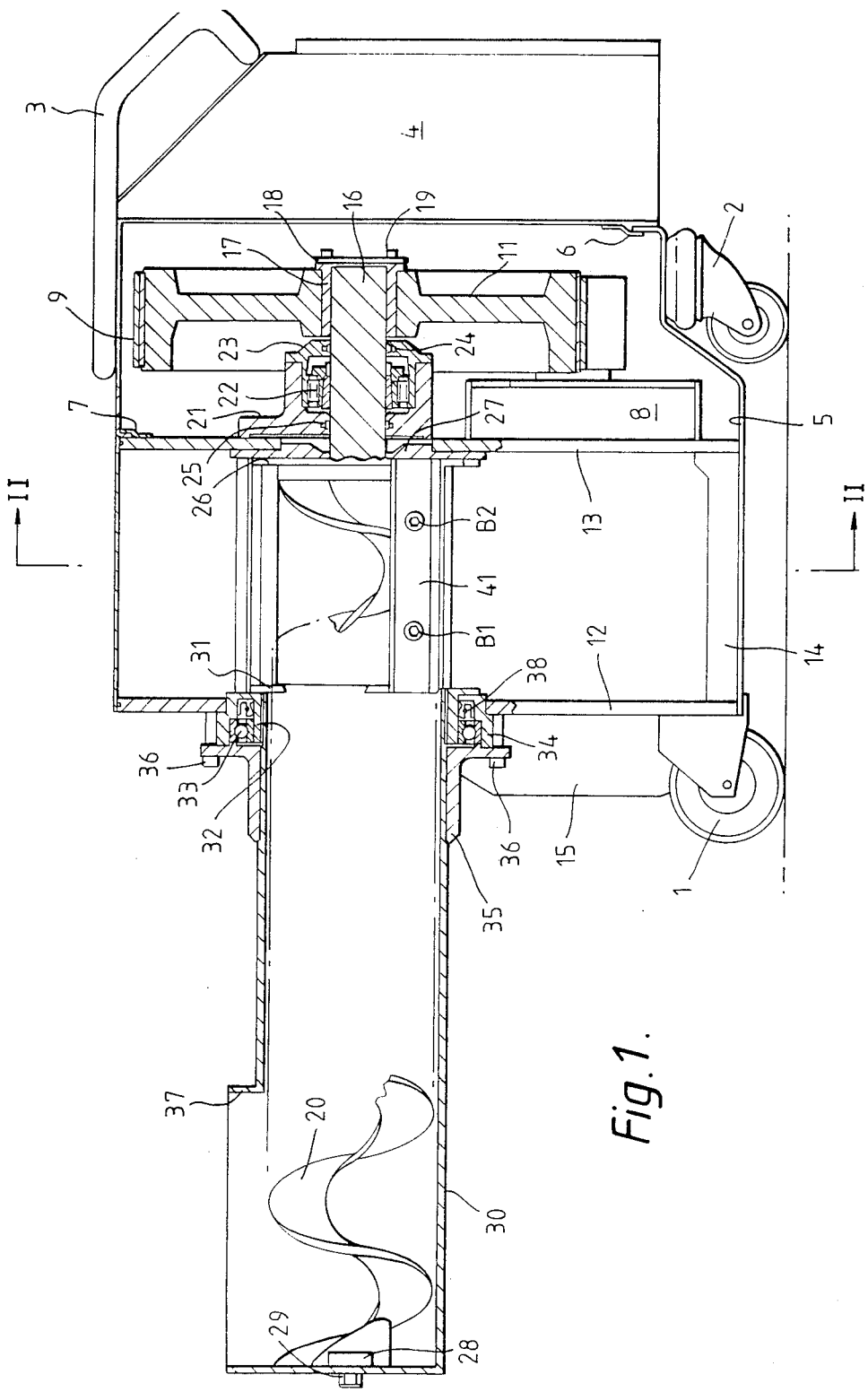

The embodiment of an apparatus according to the present invention shown on the Drawings is a mill or an apparatus for comminuting excess material in the production of plastic articles and is often designated a "granulator". The apparatus is provided with one or more fixed wheels 1 and one or more swivel wheels 2 to allow for ready relocation at and between different production units. The apparatus is further provided with a hood 4 with a handle 3, the hood being secured to the frame 5 of the apparatus by means of quick couplings 6 and 7 and some form of suitable lock (not shown). The operating units necessary for driving the apparatus are disposed in the hood 4. The hood 4 also covers a prime mover for the apparatus in the form of an electric motor 8 and transmission in the form of a cogged belt 9, a minor driving wheel 10 and a major idling wheel 11 with a certain pivotal function. The motor 8 is secured by bolts in elongate holes for adjustment of their position and for adjusting the tensioning of the cogged belt 9.

The frame 5 has two frame or housing end walls 12 and 13 and a number of struts (not all shown), for example 14 and 15. The idling pivot wheel 11 is fexedly disposed on the end of a stub shaft 16 by means of a bushing 17, a washer 18 and bolts 19. The stub shaft 16 is secured in the end of a feeder screw 20 and is journalled in the end wall 13 by means of a bearing housing 21 and a roller bearing 22. The roller bearing 22 is enclosed in the housing 21 by means of a hood 23 and a sealing 24 between the hood 23 and the stub shaft 16, and a sealing 25 between the housing 21 and the stub shaft 16. The stub shaft 16 constitutes an extension of the feeder screw 20 and departs from an end disk or plate 26 thereon. A support and sealing disk 27 is disposed between the end plate 26 and the end wall 13.

On the end plate 26, there is secured a helical, bent band of substantially rectangular cross section, this forming the feeder screw 20. The opposite end in relation to the end plate 26 displays a support bearing 28 which is secured by means of a bolt 29 in the end of a feeder tube 30. A ring 31 is fixedly disposed on the feeder screw 20 at slight spaced-apart relationship to the end plate 26. Advantageously, the ring 31 is welded onto the helically bent band of the feeder screw 20. The ring 31 is provided with a flange 32 and is rotatably journalled in the end wall 12 by the intermediary of a per se conventional ball bearing 33 and a bearing housing which consists of two parts 34 and 35, of which the one part 34 may be considered as a flange ring and the other, 35, as a sleeve which is secured in the end wall 12 by means of bolts 36. Naturally, the bolts 36 are distributed evenly about the ring. The feeder tube 30 extends into the sleeve 35 and the flange 32 and may be rotatably fixable in the desired position by means of some suitable fixing member, for example one or more bolts (not shown). The feeder tube 30 has an infeed opening 37 in which the material which is to be comminuted is fed down to the screw 20 for further advancement into the apparatus. A sealing 38 is disposed between the flange 30 and the flange ring 34.

Figure 2:
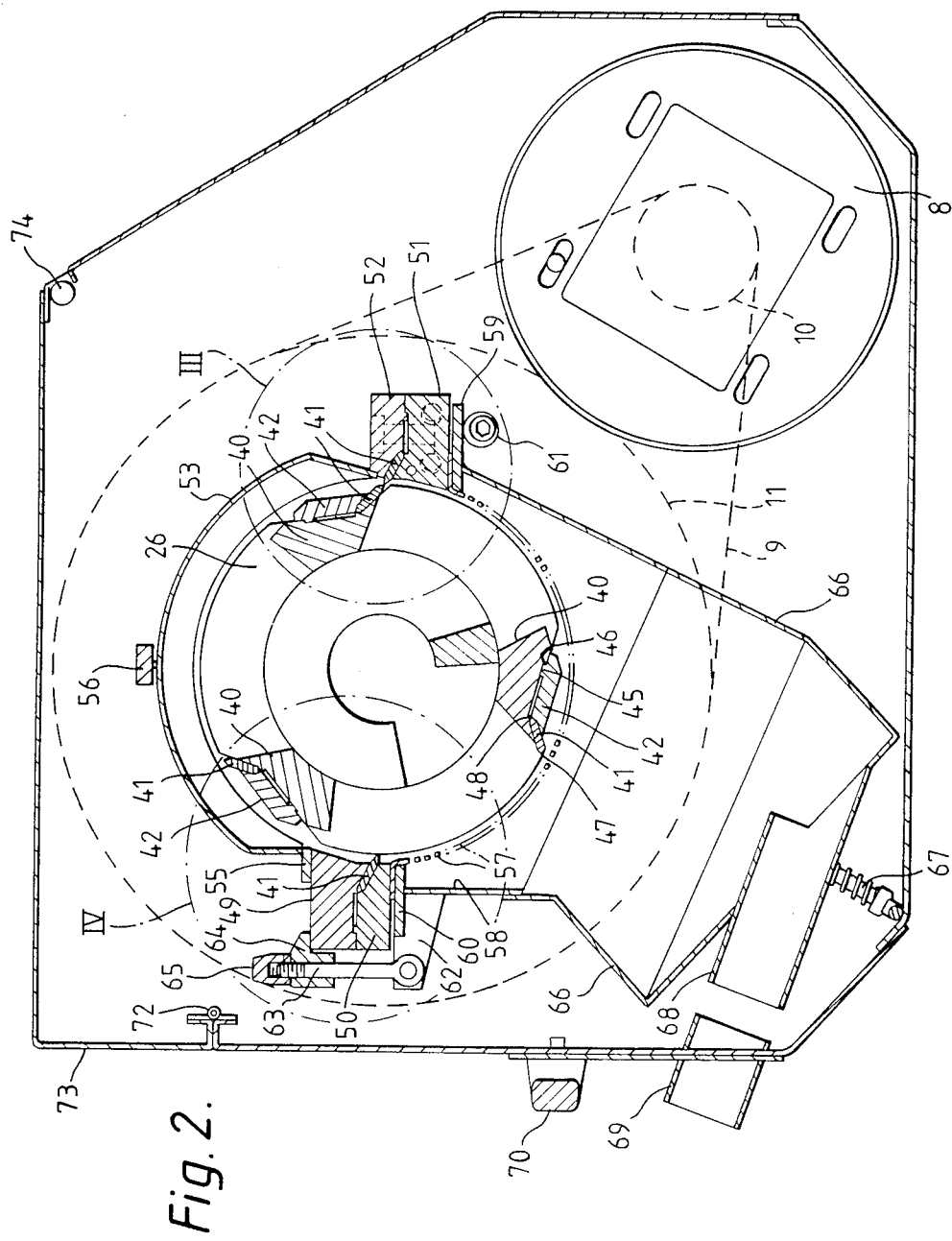
FIG. 2 is a section taken along the line I—I in FIG. 1 but on a slightly larger scale than FIG. 1.
Figure 3:
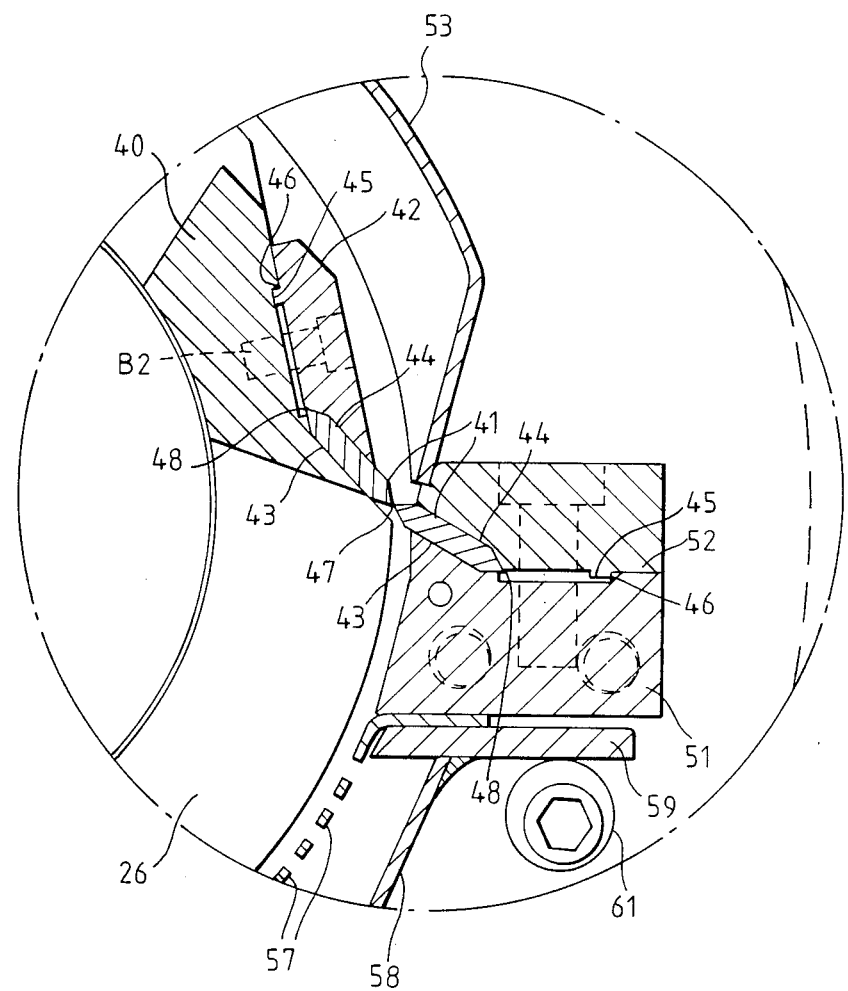
FIG. 3 shows, on a larger scale, the parts enclosed by the ghosted line III in FIG. 2.
Figure 4:
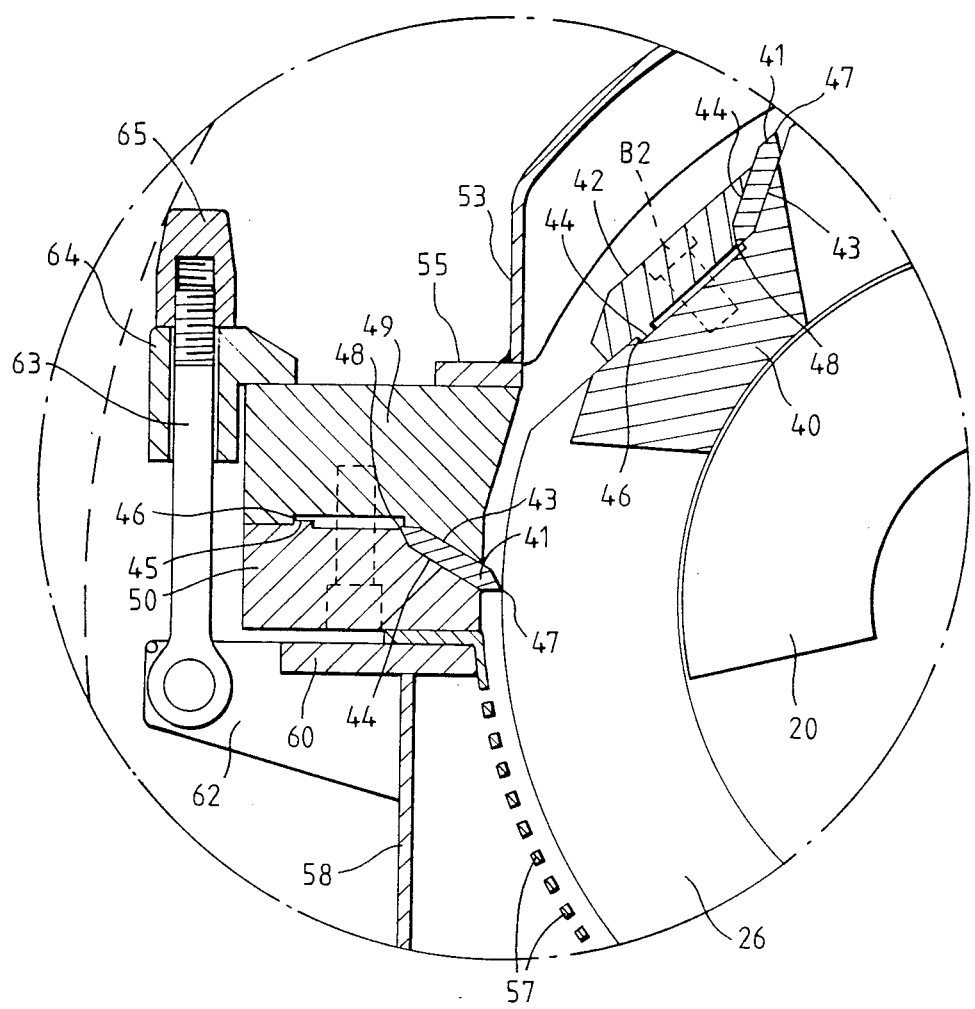
FIG. 4 shows, on a larger scale, the parts enclosed by the ghosted line IV in FIG. 2. Finally.

Between the end plate 26 and the ring 31, there are disposed a number of knives which are shown in greater detail in FIG. 2. According to FIG. 2, three knives extend in between the end plate 26 and the ring 31. The knives are identical and have a seat 40, a knife blade 41 and a bar 42 which is fixed in the seat 40 by means of bolts B1 and B2. At their ends, the seats 40 are fixedly disposed in the end plate 26 and the ring 31 by means of suitable bolts and are possibly welded onto the feeder screw 20. On the opposite side in relation to the screw 20, the seats 40 are provided with a recess 43 of a configuration which fits the knife blade 41. The bar 42 has a substantially similar recess 44 of a configuration adapted to the knife blade 41, and a ridge 45 which rests against an edge 46 on the seat 40 for fixing the position of the bar 42 in relation to the knife blade 41 and the recess 43. By means of the bolts B1 and B2, which extend through the bar 42 and into the seat 40, the bar 42 will be urged against the seat 40 and fixedly clamp the knife blade 41 between the recesses 43 and 44. The clamping force applied will be considerable, since the bar 42 will be pivoted towards the knife blade 41 about the ridge 45. For fixing the position of the knife blade 41 in the longitudinal direction of the seat 40 and the bar 42, the knife blade 41 may be provided with one or more holes which are to fit on projections in the recess 43 and possibly also the recess 44. The knife blade 41 has two cutting edges 47 and 48. The knife blade 41 is intended to cooperate with similar but fixed counter knife blades 41 between a seat 49 and a bar 50, and a seat 51 and a bar 52. The seats 49 and 51 are secured between the end walls 12 and 13 by means of bolts, while the bars 50 and 52 are secured on the seats 49 and 51, respectively, by means of substantially identical bolts to the bolts B1 and B2. The seats 49 and 51 have identical recesses 43 to the seats 40, while the bars 50 and 52 have identical recesses 44 and identical ridges 45 to the bars 42. In addition, the seats 49 and 51 have identical edges 46 to the seats 40, and, as was mentioned previously, the knife blades 41 are identical, whereby the knife blades 41 in the counter knives will be fixedly clamped in the same manner as the knife blade 41 in the rotating knives. The knife blades 41 in the fixed knives are also provided with positional fixing devices in the form of holes and pins or the like. The distance between the cutting edge on the rotating knives and the cutting edge on the fixed counter knives is as a rule 0.15 mm. To achieve a severing function, the rotating knives are also obliquely offset through a number of degrees in relation to the fixed counter knives.

The cutter assembly formed by the knives is as good as wholly enclosed by means of the end plate 26, the ring 31 and an arched coverplate 53 which extends between the end walls 12 and 13 and with its rear edge rests in a recess 54 on the inside of the bar 52 and on the seat 49 by means of a foot 55. The plate 53 is fixable between the end walls 12 and 13 by means of a clamping bar 56 which is rotatably fixed to the plate 53 and whose ends extend into a recess in the end wall 12 and a recess in the end wall 13. In the clamping bar 56, there are further provided one or more bolts which extend through the bar 56 into abutment against the upper side of the coverplate 53 and, on tightening, the ends of the clamping bar 56 will enter into engagement with the recesses in the end walls 12 and 13, the plate 53 being clamped down in the recess 54 and with the foot 55 against the seat 49. The bolts in the clamping bar 56 may be provided with knobs to facilitate dismounting and mounting of the coverplate 53.

On its underside, the cutter assembly is surrounded by a grid or perforated plate 57 which, in a per se known manner, determines the size of the chips or granules. The grid 57 is, in its turn, surrounded by a box 58 which has two support flanges 59 and 60 on which the grid 57 rests and with the assistance of which the grid 57 is urged against the seat 51 and the bar 50. The flange 59 rests on a shaft 61 which is excentric for adjusting the distance between the flange 59 and the seat 51. At the opposite end of the box 57, there is disposed an arm 62 with a pin 63 pivotally disposed thereon and carrying a heel 64 which is displaceable in its longitudinal direction, and an end nut 65. The heel 64 rests on the underside of the seat 49 and can be urged thereagainst by means of the end nut 65 which may be provided with a handle to facilitate its rotation. The box 58 forms a discharge funnel and may be divided into sections. The funnel 58 discharges into a receptacle 66 which, with the assistance of a telescopic leg 67, is urged against the funnel 58. The receptacle 66 is provided with a discharge pipe 68 which, by the intermediary of a connection sleeve (not shown), is interconnectable with a transition pipe 69 in a hatch 71 provided with a handle 70. The pipe 69 is connectable to a suitable suction conduit for transport of granulate collected in the receptacle 66 for use at a suitable worksite.

The hatch 71 is, by the intermediary of hinges 72, pivotally secured to a coverplate 73 which is pivotal about a shaft 74 and covers the space between the end walls 12 and 13. The shaft 74 may be provided with a heel for cooperation with a power switch which, on opening of the hatch 71 and the coverplate 73, entails breakage of the supply circuit to the motor 8, whereby activation of the apparatus without the coverplate and the hatch 71 being in place is rendered impossible. The shaft 74 may furthermore be provided with at least one sliding end pin, whereby the hatch 71 and the coverplate 73 are easy to remove on service and maintenance.

On the inside of the feeder tube 30, there is disposed, in a per se known manner, one or more bars for guiding the material which is to be comminuted into the cutter assembly. The surfaces of those parts most proximal the cutter assembly are provided with opposite pitch or turn, to prevent the migration of dust outwardly in a direction away from the cutter assembly.

Figure 5:
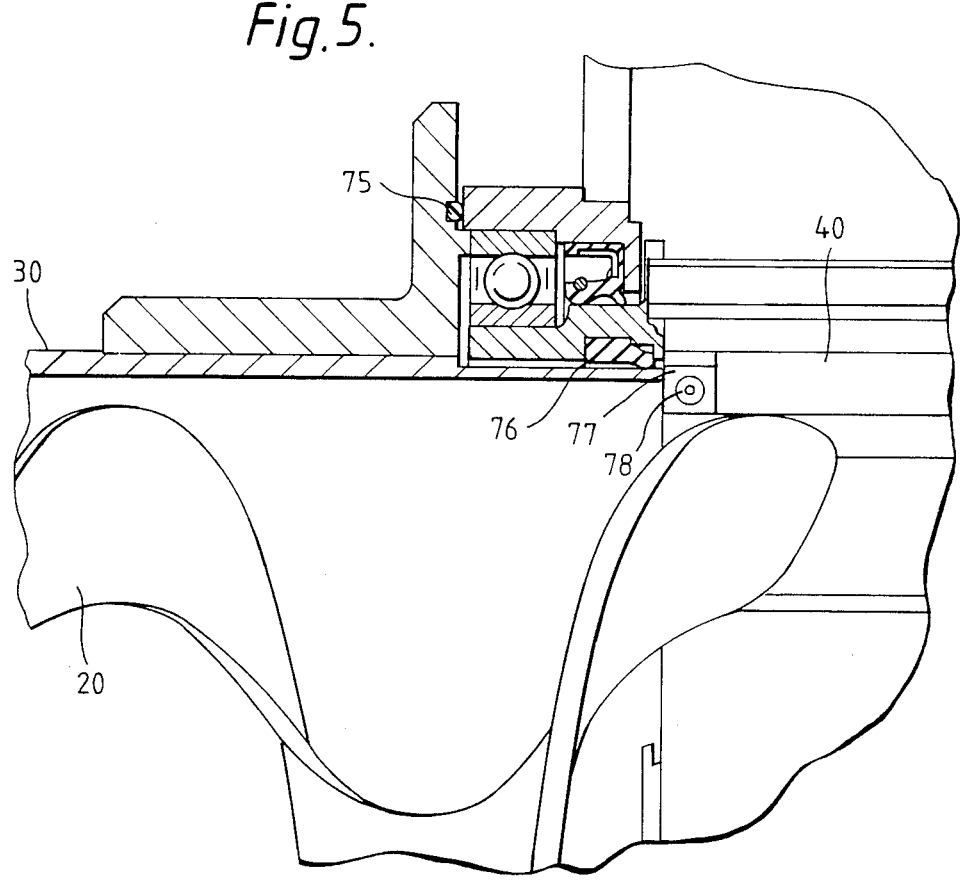
FIG. 5 shows, partly in section, parts of a further embodiment of an apparatus according to the present invention.

Such a pitch may be replaced or improved by the sealings 75, 76 shown in FIG. 5, these being an O-ring 75 and a hydraulic seal 76. FIG. 5 also shows a modified cutter assembly in which the feeder screw 20 terminates adjacent the ring 31, while the seats 40 extend forward to the plate, and a knife 77 is fixed by means of a bolt 78 on at least one of the seats 40 for cutting long pieces against a dolly in the form of a bar in the bottom of the tube 30.

I claim:

1. An apparatus in a machine for comminuting plastic, wood, or similar material into smaller pieces, for example, plastic into granules and wood into chips, comprising:
    knives (41) disposed at one end of a feeder screw (20), said knives rotating with said screw and cooperating with a number of relatively fixed counter knives (41) and a grid (57),
    each of said knives having a seat (40) which extends between an end plate (26) and a ring (31) at a proximal end of said screw (20), a knife blade (41)

adapted to the configuration of said seat (40), and a bar (42) for fixedly clamping said knife blade (41) in said seat (40).

2. The apparatus as claimed in claim 1, wherein said knife blade (41) is provided with means for positional fixing in said seat (40), said seat (40) is provided with means cooperating therewith, and said bar (42) has a ridge (45) at an edge spaced apart from said knife blade (41) and is clampable against said seat (40) and said knife blade (41) about said ridge (45).

3. The apparatus as claimed in claim 2, wherein said knife blade (41) has uniform sides and is symmetric, and displays two cutting edges (47, 48) each along its longitudinal side edge.

4. The apparatus as claimed in claim 1, wherein said feeder screw (20) is, substantially throughout its entire extent, centrally open and is disposed in a feeder tube (30) with an infeed opening (37) at an opposite end in relation to said knives.

5. The apparatus as claimed in claim 4, wherein said screw (20) is in the form of a substantially helically extending band of substantially rectangular cross section.

6. The apparatus as claimed in claim 4, wherein one end (28, 29) of said screw (20) is journalled in said feeder tube (30), and another end of said screw (20) via said plate (26) carries a journalling shaft (16) for journalling said screw (20) in a housing (21) and for coupling to suitable drive means (8, 9, 10, 11).

7. The apparatus as claimed in claim 6, wherein an upper region of said housing consists of an arched plate (53) and a lower region of said housing consists of an arched grid or plate (57) being perforated with a selected perforation size and having a receptacle (58, 66).

8. The apparatus as claimed in claim 6, wherein said counter knives (41) extend between end walls (12, 13) of said housing and have a seat (49, 51), a knife blade (41), and a bar (50, 52) of substantially the same construction as said knives which rotate with said screw.

9. The apparatus as claimed in claim 8, wherein said counter knives form supports for an upper region (53) and a lower region (57) of said housing and are fixedly retained by means of quick couplings (56, 59-65) in said end walls (12, 13) and said counter knives, respectively.

10. The apparatus as claimed in claim 8, wherein said feeder tube (30) is rotatably-supported in a sleeve (35) disposed in said end wall (12) of said housing proximal said ring (31) on said screw (20) and is provided with means for fixing said feeder tube (30) in a desired position.

* * * * *